United States Patent [19]

Crowdes, Jr.

[11] Patent Number: 4,491,007
[45] Date of Patent: Jan. 1, 1985

[54] RANGEABLE SPEEDOMETER/ODOMETER

[75] Inventor: George J. Crowdes, Jr., Contoocook, N.H.

[73] Assignee: Beede Electrical Instrument Co., Inc., Penacook, N.H.

[21] Appl. No.: 446,222

[22] Filed: Dec. 2, 1982

[51] Int. Cl.$^3$ .................. G01P 3/50; G01P 21/02; G01C 22/02
[52] U.S. Cl. ........................................... 73/2; 324/166
[58] Field of Search .................. 73/2; 324/166, 171, 324/167

[56] References Cited

U.S. PATENT DOCUMENTS

| | | | |
|---|---|---|---|
| 2,613,071 | 10/1952 | Hansel | 73/490 |
| 3,441,943 | 4/1969 | McCue et al. | 324/171 X |
| 3,602,817 | 8/1971 | Nilson | 324/169 |
| 3,614,615 | 10/1971 | Cass | 324/166 X |
| 4,140,970 | 2/1979 | Graziano | 324/166 |
| 4,167,699 | 9/1979 | Baker | 324/171 |
| 4,291,268 | 9/1981 | Okuyama | 324/166 |

OTHER PUBLICATIONS

"Moving Magnet Meter Movements"—Linear Application Update CLAU-324, Nat'l. Semiconductor Corp., Santa Clara, Calif., Feb. 1978.
"LM2907, LM2917", Linear Databook, pp. 9-80 to 9-92, Nat'l. Semiconductor Corp., Santa Clara, Calif. 1982.

Primary Examiner—James J. Gill
Attorney, Agent, or Firm—Weingarten, Schurgin, Gagnebin & Hayes

[57] ABSTRACT

The present invention describes an adjustable speedometer/odometer to accommodate various vehicle drive configurations such as a variety of vehicle tire size and rear axle ratios. The range adjustment is made at the factory or by service personnel, and is implemented by a plurality of switches, insuring a positive selection of the desired range value, thereby eliminating the need for calibration. The conventional mechanical speedometer/odometer and speedometer cable are replaced by a signal transducer mounted on the transmission, and an electronic speedometer unit. The transducer sends signal pulses to the electronic speedometer unit that displays the vehicle speed and distance travelled, by a moving-magnet meter and an incremental counter, respectively. In addition, the range of the speedometer/odometer is switched to accommodate a dual-axle ratio differential according to a signal from an axle mounted switch. The speedometer/odometer range value is changed according to a constant proportion representing the difference in the two axle ratios. Moreover, the present invention is adaptable to receive signal pulses derived from a variety of vehicle locations, and is adaptable for other indicator applications, such as a tachometer.

10 Claims, 1 Drawing Figure

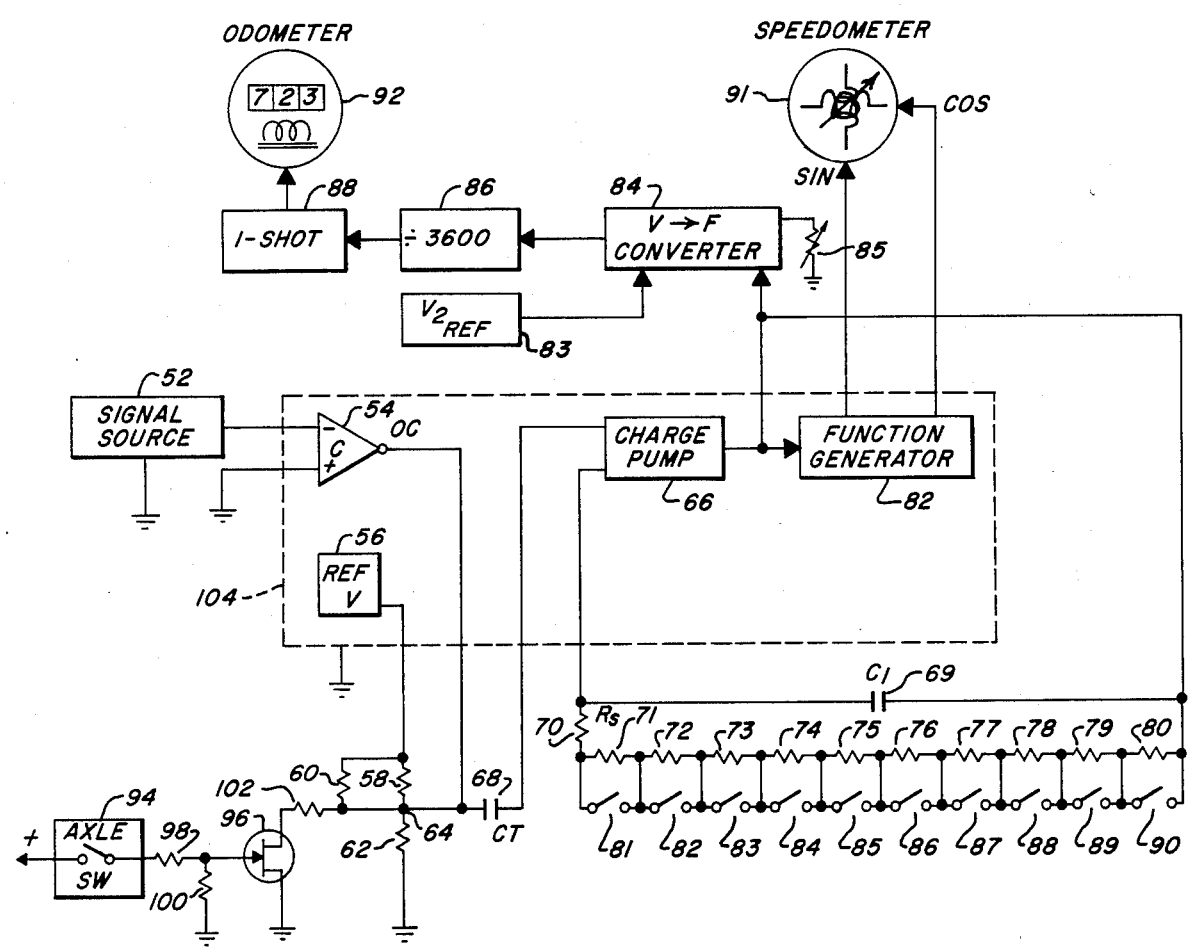

RANGEABLE SPEEDOMETER/ODOMETER

FIELD OF THE INVENTION

The present invention relates to speedometers and odometers, and more particularly to selectable range electronic speedometers and odometers.

BACKGROUND OF THE INVENTION

Traditional mechanical speedometers are connected to the transmission output shaft by a gear driven flexible rotating shaft enclosed in a cable. Except for a change in axle ratio, the speedometer cable rotation is then directly proportional to the road speed. The proportion is determined by the ratio between a transmission drive gear and the mating cable gear, as well as the tire diameter and rear axle differential ratio. The speedometer unit is attached to the other end of the speedometer cable and provides a visual indication of speed from the speedometer cable rotation according to a second fixed proportion. Since a manufacturer may make vehicles which have a rear axle ratios that vary over a nearly 2-to-1 range, and select tires which have a difference in wheel revolution per mile of nearly 20 percent (between the largest to the smallest tire), the manufacturer must stock a wide variety of speedometers or speedometer cable gears to provide the proper speed and odometer readings. Moreover, problems of mechanical failure and routing of the speedometer cable within the body of the vehicle require significant time and effort to resolve with each different vehicle produced.

In electric speedometers, a magnetic pick-up is placed close to the speedometer cable drive gear in the transmission housing to produce a periodic signal that is proportional to the vehicle speed. The periodic signal is received by an electric or electronic speedometer unit having a fixed relationship between the periodic signal and the indicated vehicle speed and distance travelled. In such speedometer units, the vehicle manufacturer must stock a unique speedometer unit for each tire size and/or axle ratio. Adjustments are made within the speedometer unit itself, and require precision adjustment and calibration of the ratio between the indicated velocity and the period of the received signal. Moreover, a separate adjustment of the odometer range is necessary. The adjustments require sophisticated operator training, tools, and calibration equipment not normally available outside of the factory.

In special purpose or in heavy duty commercial vehicles, the rear axle (differential) often includes a second gear ratio which is selectable by the vehicle operator. In order for the mechanical speedometer to accommodate the additional axle ratio, additional mechanical gear ratios are required which correspond to the appropriate rear axle ratio. Electric speedometers typically include a divider to operate the odometer counter. To accommodate a second rear axle ratio would require a counter having a second divider modulus, which second modulus is likely to be inconvenient for available digital counters.

BRIEF DESCRIPTION OF THE INVENTION

The speedometer/odometer of the present invention has an adjustable range to indicate vehicle speed and elapsed distance for various combinations of tire size and axle ratio. The selectable range adjusts both the speedometer and odometer indications simultaneously. The range is selectable from among a large number of discrete values, to allow the vehicle manufacturer or service personal to stock a single speedometer/odometer unit for virtually all vehicle requirements. The selection process may be performed by service personal without special tools, training, or calibration equipment. In addition, the selected range can be automatically adjusted to accommodate a second rear axle ratio. The component elements of the speedometer/odometer according to the present invention may be easily reduced to integrated circuits, resulting in an economical speedometer/odometer which is easily installed, maintained, and serviced throughout the life and configuration changes of the vehicle.

BRIEF DESCRIPTION OF THE DRAWING

These and other features of the present invention may be better understood from the following, solely exemplary, detailed description together with the drawing, wherein the single FIGURE is a block and schematic diagram of one embodiment of a speedometer/odometer embodying the invention.

DETAILED DESCRIPTION OF THE INVENTION

With reference to the drawing, the speedometer/odometer 50 receives a periodic signal from a signal source 52. The signal source 52 is preferably a magnetic transducer located in close proximity to the speedometer drive gear within the transmission. The transmission transducer and gear assembly is well known in the art and is not discussed herein. The comparator 54 converts the periodic signal into a signal of uniform amplitude by comparing the signal of source 52 to ground potential. The amplitude of the signal produced by the comparator 54 is determined by a voltage divider comprising resistors 58, 60 and 62 connected between ground potential and a reference voltage V1 of the reference supply 56. The resistors 58 and 62 are generally selected so that the voltage at the junction 64 is approximately 60 percent of the voltage V1. The resistor 60 is selected to provide a fine adjustment when calibrating the entire speedometer/odometer instrument. When the signal from the source 52 causes the comparator 54 output to become active, the comparator 54 effectively shunts the resistor 62 to the ground potential, reducing the signal at the junction 64 to zero volts. The signal at junction 64 alternates between zero and approximately 6 volts according to the periodicity of the signal received from the signal source 52. A charge pump 66 is used as a high accuracy frequency to voltage converter. The alternating signal at common point 64 is coupled into a charge pump 66 by a timing capacitor 68. The capacitor 68 becomes charged for each pulse produced at the junction 64. More particularly, the duration of the resulting periodic signal at 64 is at least 5 time constants of the network formed by the capacitor 68 and the associated circuit resistances, including resistors 58, 60, 62 and the charge pump 66 input resistance. The charge pump 66 operates according to well known principles, wherein the resulting output signal is a result of the combination of the timing capacitor 68 and the output resistors comprising resistors 70 through 80. An integrating capacitor 69 is included to smooth the ripple of the output voltage, and is selected according to the desired level of ripple. Additional discussion of charge pump circuits is available in several texts, including Application Note 162, of National Semiconductor Corporation of Santa Clara, Calif. dated 1976, listing parts LM 2907 and LM 2917 and is herein incorporated by reference.

The speedometer 91 comprises a moving magnet air core meter, which has two orthogonal windings. The two windings receive a signal corresponding to the sine and cosine value of the desired speedometer needle position. When energized with the appropriate signal, each coil produces a magnetic field whose vector sum aligns a magnet (connected to the needle) in that direction. A function generator 82 provides the necessary sine and cosine signals to the speedometer 91 according to the signal received from the charge pump 66. Moreover, the charge pump output may also be conditioned and received by a conventional D'Arsonval meter.

The odometer 92 comprises a numerical counting meter which increments a numeric indicator according to the number of pulses received. The odometer 92 is driven by a pulse train generated by a voltage to frequency converter 84, which produces a periodic pulse signal proportional to the analog charge pump 66 output signal. The frequency output from the converter 84 is received by a counter 86 which divides the signal by 3600. The output signal then corresponds to one pulse per tenth of mile. The signal pulse width is then normalized by a one-shot monostable multivibrator 88 which provides a uniform pulse width over the entire frequency (and velocity) of the received signal range. The resulting pulse is of sufficient duration and amplitude to advance the odometer 92.

Some, if not all elements of the present invention may be reduced to an integrated circuit. For instance, the particular embodiment shown here incorporates elements 54, 56, 66 and 82 in a single integrated circuit 104.

In operation, the rangeable speedometer/odometer of the present invention works as follows. With a 16 tooth gear connected to the output shaft of the vehicle transmission, 16 pulses are produced per revolution of the propeller drive shaft. Therefore, the signal from the signal source 52 can be represented by the following equation:

$$F@60 \text{ mph} = 0.2666 \times \text{axle ratio} \times \text{tire revolutions/mile}. \qquad (1)$$

The axle ratios vary at least from 3.7 to 6.67, and the tire revolutions per mile typically vary from 456 to 555. In the extremes, corresponding to the smallest tire size with the highest axle ratio and the largest tire size with the smallest axle ratio, the full scale frequency from the source 52 varies between 600 Hz and 1330 Hz. Defining the timing capacitor 68 as Ct and the output resistor Rs as the sum of resistors 70 through 80, the transfer function for the circuit of the present invention is generally given by:

$$K = C_t \times F \times R_s \qquad (2)$$

where K is an arbitrary constant associated with the particular circuit embodiment.

To provide an instrument which is precisely adjustable in the field, it must first be calibrated in manufacture. The resistor 60 is selected to provide the reading on the meter face of 80 MPH at 1333 Hz frequency from source 52 and with Rs set to 69.8 Kohms (all switches closed). Next the V-to-F converter 84 is adjusted. The output of the V-to-F converter is adjusted for zero output for a zero frequency signal from source 52 by adjusting a second reference voltage V₂. The voltage V₂ is received by the V-to-F converter 84 to offset any DC bias in the output signal of the charge pump 66. With Rs set to 83K plus 69.8K ohms and the signal from source 52 at 449 Hz (for 60 MPH), the V-to-F converter 84 is set to provide an output of 600 Hz. The 600 Hz output is set by adjusting resistor 85. The counter 86 divides the output signal of the convertor 84 output by 3600. Each resulting pulse is received by the odometer and corresponds to 0.1 miles; therefore at 60 mph an output pulse is produced every 6 seconds. The factory calibration is now complete.

The ranging of the finished speedometer/odometer 50 is provided by adjusting Rs with the resistors 71 through 80 by selection of switches 81 through 90, respectively. Resistor 70 is typically 69.8K ohms. The resistors 71 through 80 are shown in a decrementing sequence, providing resistances of 40K, 20K, 10K, 8K, 4K, 2K, 1K, 500, 250 and 125 ohms respectively; other sequences of resistance values are possible.

The linear frequency-to-voltage charge pump converter 66, has a slight offset in the relationship between voltage output signal (for a given input frequency) and total resistor Rs value. A relationship shown below (3) includes the offset to accurately describe the total Rs value (in K ohms):

$$Rs = (449/F) \times 152.8[1 + (F - 449/550 \times 0.02)] \qquad (3)$$

Moreover, other distortions or nonlinearities in the relationship between Rs and the charge pump 66 output signal may be anticipated and corrected by adjusting slightly the selected switch combination. The different (corrected) switch combinations are incorporated in the selection chart (Table 1) so that the speedometer/odometer installer will not need to calibrate the instrument after the range network is switch adjusted. Shown below in Table 1 are the switches closed to obtain the total Rs values selected according to both the number of tire revolutions per mile and the rear axle ratio:

TABLE 1

| | RANGE SWITCH CLOSURE TIRE REV/MILE | | |
|---|---|---|---|
| AXLE RATIO | 456 | 480 | 555 |
| 3.7 | 86,7;90 | 84,6,8;90 | 82,4,6 |
| 4.33 | 83,4,5,6,7 | 82,4,6,7,9;90 | 81,5,6,7,8;90 |
| 5.43 | 81,4,6,7 | 81,3,5,6;90 | 81,2,4,7;90 |
| 6.67 | 81,2,4,6 | 81,2,4,5,6;90 | 81,2,3,4,5,6,8,9;90 |

The range of the adjustment possible by the switched network is determined by the total resistance value of the resistors 71 through 80 in relationship to the resistance of resistors 70 through 80 inclusive. Moreover, the resolution is determined by the number of switches and resolution of included resistors. In the example shown with 10 switches having resistances ranging from 40K to 125 ohms, a resolution of at least 0.15% is obtained, and is more than adequate in most instances.

An additional feature of the present invention is the accommodation of a dual ratio rear end axle. The axle switch 94 is connected to the rear axle change mechanism to become closed when the lower axle ratio is engaged. The switch is connected to a local battery voltage and resistors 98 and 100, and causes a field effect transistor 96 to become conductive. The transistor 96 in combination with resistor 102 provides an additional shunt to resistor 62 of the voltage divider, such that the voltage at circuit point 64 is reduced by a value corresponding to the ratio between the lower axle ratio and the higher axle ratio. Typically, the difference is likely to be 73.07% of the higher axle ratio; correspondingly, the activation of the field effect transistor 96 and the resistor 102 causes the voltage across the juction 64 to be reduced to 73.07% of the signal corresponding to the higher axle ratio. Typically, the transistor 96 offers small resistance when turned on, especially in comparison to resistor 102. A resistor 102 is selected after the resistor 60 has been selected.

Alternate embodiments of the present invention by one skilled in the art are within the scope of the present invention. Moreover, other signal sources, such as alternator signals may be used by the present invention, in such instances where an engine RPM is desired. Therefore, the present invention in not to be limited except by the following claims.

What is claimed is:

1. A rangeable speedometer receiving a pulse signal having a pulse rate corresponding to velocity to be measured, comprising:
    pulse integrator means to produce an analog voltage output in a relationship to said pulse signal and including a selectable ranging network for changing the relationship of said pulse integrator output voltage to said pulse signal, said relationship including at least one of system nonlinearities, offsets, and distortions;
    a speedometer drive circuit providing a speedometer drive signal according to said pulse integrator output signal; and
    a speedometer indicator providing a visual representation according to said speedometer drive signal, wherein said ranging network includes a switch selectable network comprising a plurality of switched resistances of values in decrementing sequences, said switch selectable network being adjusted to approximate the desired ranging network according to at least one of said nonlinearities, signal distortions, and said relationship to provide accurate representation of the velocity to be measured.

2. The speedometer of claim 1 wherein:
    said pulse integrator means includes a charge pump circuit.

3. The speedometer of claim 2 further including:
    odometer means providing a cumulative indication of distance travelled according to said pulse integrator output signal.

4. The speedometer of claim 3 wherein said odometer includes:
    an incremented numeric indicator; and
    a pulse generator providing a pulse sequence to said incremental numeric indicator according to said pulse integrator output signal.

5. The speedometer of claim 1 wherein:
    said speedometer indicator comprises an air core meter; and
    said speedometer drive circuit provides sine and cosine drive signals to said speedometer indicator according to said pulse integrator output signal.

6. The speedometer of claim 1, further including:
    second switching network to reduce said integrator output voltage by a constant proportion, said second switching network being activated by a range select signal.

7. The speedometer of claim 6, wherein:
    said second switching network includes a field-effect transistor.

8. The speedometer of claim 6, wherein:
    said range select signal is activated by a change in axle ratio.

9. For use in a wheeled vehicle having a selected tire size and a selected drive axle ratio, an adjustable speedometer/odometer comprising:
    means to receive a periodic signal according to said selected tire size and said selected axle ratio and the velocity of said vehicle;
    frequency to voltage converter means receiving said periodic signal providing a charge signal related to the period of the received signal;
    a range network receiving said charge signal and producing a scaled output signal of discrete intervals having a proportional relationship to said received charge signal;
    a speedometer indicator;
    speedometer driver means receiving said scaled output signal and providing a corresponding speedometer drive signal to said speedometer indicator;
    an odometer indicator; and
    odometer drive means receiving said scaled output signal and providing a corresponding odometer drive signal to said odometer indicator, wherein
    the relationship between the input frequency and output voltage of said frequency to voltage converter including at least one of signal errors, comprising system offset, distortion and nonlinearities; and
    said range network includes a plurality of resistors to form a voltage divider, and switch means for range network adjustment selectively connected to at least one of said plurality of resistors to provide a correction in the indications of both said speedometer and odometer indicator for at least one of said signal errors, change in tire size and change in axle ratio.

10. A method of calibrating a speedometer providing an indication of speed in response to an input signal and having a switchably adjustable selectable range adjustment, said method comprising the steps of:
    determining the nonlinear relationship between input signal and indicated speed incuding factors comprising the correspondence between input signal and true speed, signal nonlinearities, offsets, and distortions;
    calculating the appropriate adjustment of said selectable range adjustment to include correction for said factors, wherein said indication of speed corresponds to said true speed; and
    switchably adjusting said selectable range adjustment to provide a correspondence between the indication of speed and the true speed.

* * * * *